United States Patent
Musante et al.

(10) Patent No.: US 8,302,049 B2
(45) Date of Patent: Oct. 30, 2012

(54) METHOD FOR ENABLING MULTIPLE INCOMPATIBLE OR COSTLY TIMING ENVIRONMENT FOR EFFICIENT TIMING CLOSURE

(75) Inventors: Frank J. Musante, Poughkeepsie, NY (US); William E. Dougherty, Pleasant Valley, NY (US); Nathaniel D. Hieter, Clinton Corners, NY (US); Alexander J. Suess, Hopewell Jct., NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 12/958,431

(22) Filed: Dec. 2, 2010

(65) Prior Publication Data

US 2012/0144357 A1    Jun. 7, 2012

(51) Int. Cl.
*G06F 17/50*    (2006.01)
(52) U.S. Cl. ....................................... 716/108
(58) Field of Classification Search .................. 716/108
See application file for complete search history.

(56) References Cited

U.S. PATENT DOCUMENTS

| | | | |
|---|---|---|---|
| 5,251,147 A * | 10/1993 | Finnerty | 716/101 |
| 7,290,232 B1 | 10/2007 | Fung et al. | |
| 7,739,098 B2 | 6/2010 | Kucukcakar et al. | |
| 2008/0244476 A1 | 10/2008 | Fotakis et al. | |
| 2010/0153897 A1* | 6/2010 | Zahn | 716/9 |
| 2010/0180244 A1* | 7/2010 | Kalafala et al. | 716/6 |

* cited by examiner

*Primary Examiner* — Suchin Parihar
(74) *Attorney, Agent, or Firm* — H. Daniel Schnurmann

(57) ABSTRACT

A method of performing a static timing analysis based on slack values to verify and optimize a logic design includes: selecting one or more circuits within the logic design having at least two inputs taking on a known value; identifying a critical input that controls an output arrival time of the selected circuit from among the inputs that take on the known value; determining one or more non-critical input of the circuit a required arrival time based on the difference between the arrival times of the critical and non-critical inputs; and computing the slack at a critical input based on the difference between the AT of the critical and non-critical inputs. The design optimization based on the slack defined by arrival time differences preferably uses a reverse merge margin design metric. The metric determines the exact required amount of improvement in the input arrival time of non-critical signals of a clock shaping circuit.

20 Claims, 4 Drawing Sheets

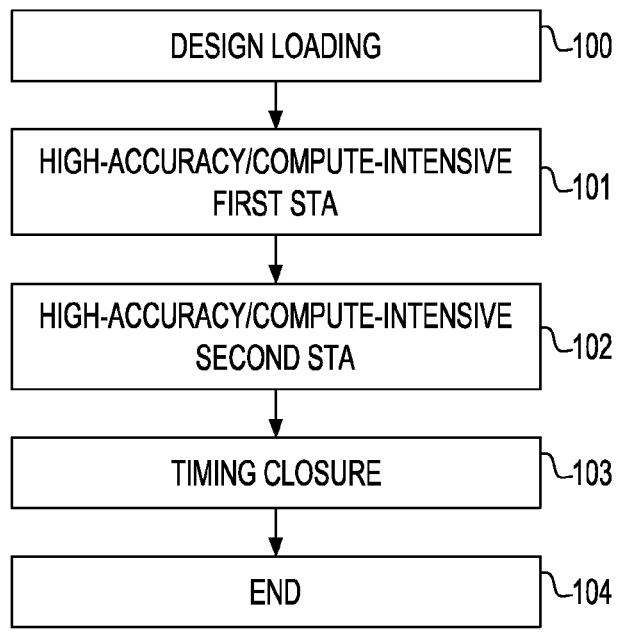
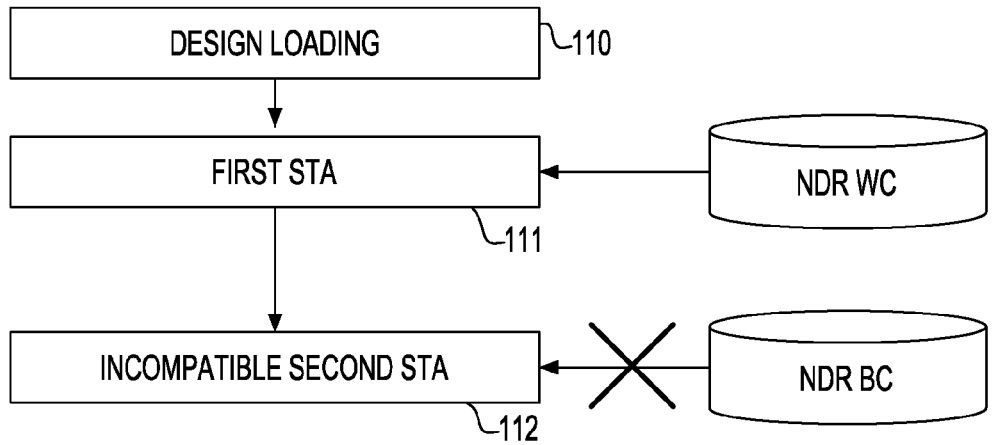
FIG. 1A
FIG. 1B

DATA ARRIVAL TIME: 10
DATA REQUIRED ARRIVAL TIME: 9
DATA SLACK: 9 - 10 = -1

STORED SLACK: -4
DATA REQUIRED ARRIVAL TIME: 9
DELTA SLACK: (-4) - (-1) = -3
NEW COMPUTED RAT: 9 + (-3) = 6

DATA ARRIVAL TIME: 10
DATA REQUIRED ARRIVAL TIME: 6
DATA SLACK: 6 - 10 = -4

METHOD FOR ENABLING MULTIPLE INCOMPATIBLE OR COSTLY TIMING ENVIRONMENT FOR EFFICIENT TIMING CLOSURE

FIELD OF THE INVENTION

The present invention relates to the field of computer aided design of integrated circuits, and more specifically to enable efficient timing closure of designs in multi-corners and multi-mode environments when corners or modes are incompatible or costly.

BACKGROUND

Timing closure of nanometer designs now requires extensive timing coverage to meet yield predictions. Smaller device geometries have increased variability in manufacturing and second order effects, such as coupling, now play a significant role in signal integrity. To ensure that the design meets the required timing constraints, design engineers typically run statistical static timing analysis or make multiple timing runs at various modes and process conditions. Static timing analysis (STA) is one of the pillars for verifying digital Very Large Scale Integrated (VLSI) circuit designs, and is widely used to predict the performance of the designs. STA is often used on very large designs for which exhaustive timing analyses are impossible or impractical in view of the number of patterns required to perform the analysis. State of the art static timing analysis tools have the ability to model designs with multiple timing modes and multiple corners only in a single environment.

a. A timing engine allows separate timing constraints and extracted parasitics to be loaded for each timing corner, and controls are available to adjust the process conditions. The ability to model the timing of a design across the process space in a single environment allows users to examine problems for manual repair or allow an automated timing closure tool to fix the problem. The benefit of operating in such an environment is that logic and wire optimizations can immediately evaluate the effects of a potential fix across all analysis modes and corners, preventing the introduction of a new problem.

The optimization of circuits in a multiple corner timing environment does have some drawbacks, however. The creation and initialization of multiple timing analysis modes consumes run time and increases process memory usage. Each additional timing model typically requires a separate timing graph which must be incrementally updated as netlist changes are made during the evaluation of fixes. The cost of incrementally updating the timing graph is further exacerbated when the timing environment employs high-accuracy timing modeling, such as rice delay calculation. The run time cost is also extended when running in a statistical static timing environment and all of these problems are further exacerbated by increasing the size of the design.

Referring to FIG. 1a, a flow chart is illustrated embodying a prior art multiple mode/multi-corner timing environment with timing closure, the timing closure in the illustrative environment being highly computer intensive.

Step 100 loads the design and any accompanying timing rules. Step 101 initializes the first timing analysis more or corner. Step 102 initializes a second timing analysis mode or corner. Step 103 performs automated timing closure that incrementally evaluates timing changes across both timing analyses performed in step 101 and 102. Although this approach allows tools to accurately fix timing problems, there is however a run-time cost associated with maintaining multiple timing models, rendering this approach inefficient and costly. When a tool makes a change to fix a problem the timing model for both STA graphs must be updated to allow the tool to evaluate whether the fix was sufficient. If the fix was not acceptable, another solution can be tried, or the tool may revert to its original implementation. In some cases, various optimizations can revisit the timing problem multiple times, and each change to the netlist requires the timing graph to be incrementally updated. Additionally there may thousands of timing problems to fix, and the cost of incrementally updating the design becomes prohibitive. The result is timing a closure tool that can run for many days, especially when run on large netlists.

Referring to FIG. 1b, a flow chart illustrates a problematic scenario encountered when attempting to initialize multi-mode/multi-corner STA in the prior art.

In certain instances, the prior art STA tool may not be able to load certain timing rules because of compatibility issues, or simultaneously handle certain types of assertions. In these situations, the user typically will optimize for a late mode timing closure and rerun the tool in another process environment to verify timing closure. This may expose problems in the current environment, and attempts to fix them could create problems in the original corner.

Still referring to FIG. 1b, in Step 110, the design is loaded along with any accompanying timing rules. In Step 111, the STA tool initializes a first static timing analysis corner for worst-case operating conditions. In step 112, the STA tool attempts to initialize a second static timing analysis corner for the best-case operating conditions. The attempt fails to initialize the timing graph because the best case (BC) timing rule is incompatible with the worst case (WC) timing rule.

Presently, the optimization of circuits for timing closure may require access to multiple analysis modes that are not available, or may be prohibitive to initialize. Furthermore, the tool may not allow the loading of timing rules under different characterization points, and the timing environment may be prohibitive for optimization (e.g., a high accuracy timing environment incurs an increased run time), and the chip timing with multiple analysis modes under a single process may exceed the machine memory limits.

BRIEF DESCRIPTION OF THE DRAWINGS

The present invention will be understood and appreciated more fully from the following detailed description of the invention, taken in conjunction with the accompanying drawings of which:

FIG. 1a is a flow embodying a multiple mode/multi and corner STA run, as known in the prior art.

FIG. 1b exemplifies one pitfall involved with initializing prior art multi-mode/multi-corner timing environments.

FIG. 3a illustrates an embodiment of the invention, wherein the user invokes the STA and generates a slack record.

FIG. 3b shows a diagram illustrating a process that initializes a different timing analysis mode or corner of the same design, as loaded in FIG. 3a.

SUMMARY

An embodiment of the invention provides an STA capable of modeling all the timing corners without imposing constraints on run time and memory usage, the STA being capable of importing rules and assertions such that a single integrated and incremental timing environment is possible, and capable of providing an integrated and incremental timing environment to achieve the necessary optimization.

An embodiment of the invention recreates a static timing analysis environment, either from a different running process or from the same, in an incremental timing environment that is both fast and accurate, for optimizing the netlist.

An embodiment of the invention merges timing data from one analysis mode into another, using the combined timing information to drive design optimization without being limited to just holding violations.

An embodiment of the invention provides timing closure optimizations repair problems when multiple timing analysis modes are not immediately available or when the timing closure in a particular timing environment is run-time prohibitive.

An embodiment of the invention provides a method for performing a static timing analysis based on slack values to verify and optimize a logic design, the method including: using a computer, selecting at least one circuit within the logic design having at least two inputs taking on at least one known value; identifying a critical input that controls an output arrival time (AT) of the selected circuit from among the at least two inputs that take on at least one known value; determining for at least one non-critical input of the circuit that is not the identified as a critical input a required arrival time based on a difference between arrival times of the critical and non-critical inputs; and computing a slack at a critical input based on the difference between the AT of the critical and non-critical inputs.

DETAILED DESCRIPTION

The present invention and various features, aspects and advantageous details thereof are explained more fully with reference to the non-limiting embodiments that are illustrated in the accompanying drawings and detailed in the following description.

Figure 2:
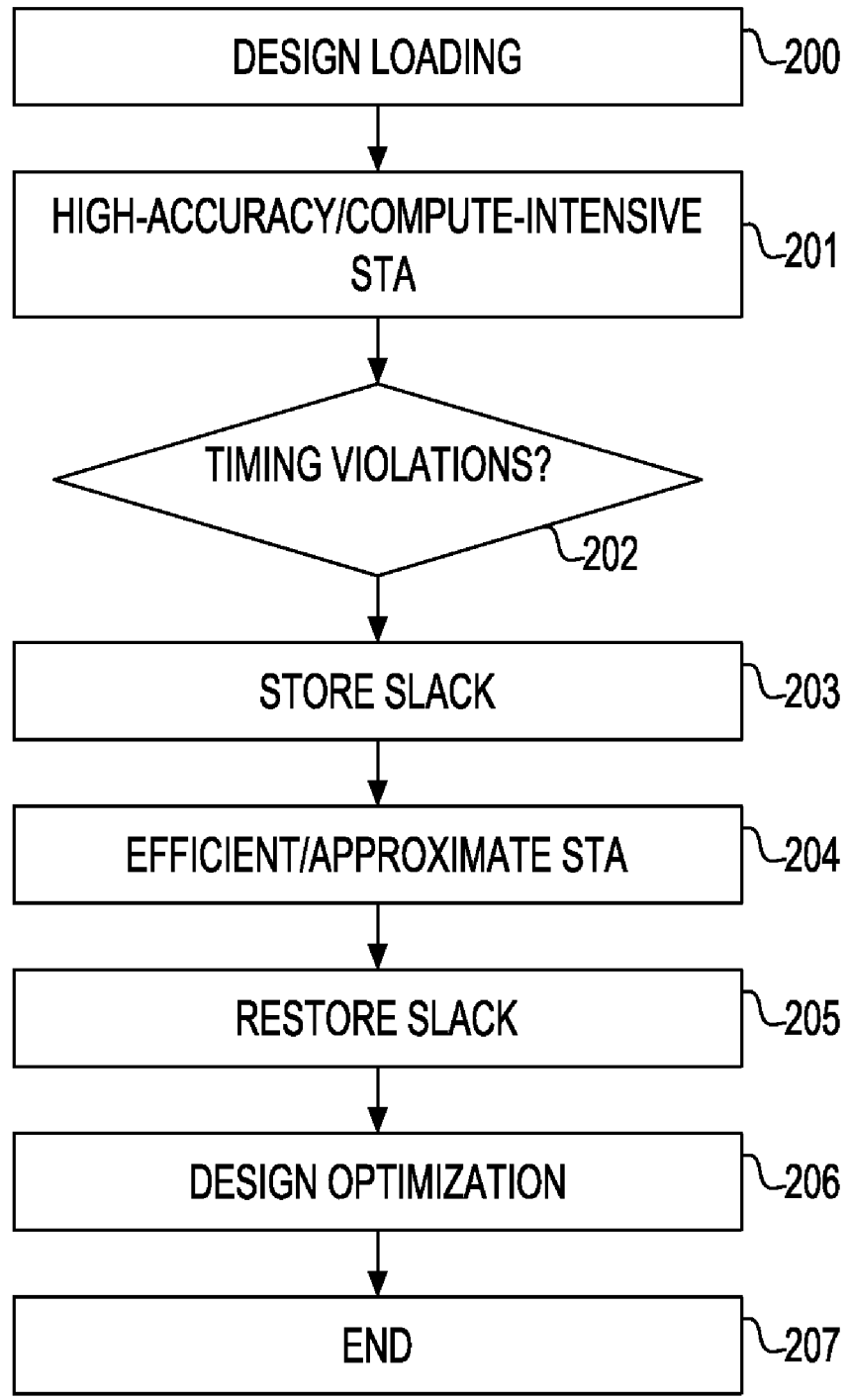
FIG. 2 shows a flowchart illustrating an embodiment of the present invention, describing the timing closure tool preferably used.

Referring to FIG. 2, an embodiment of the invention is shown that reduces the run-time cost of optimization. The process loads the design data and performs a first static timing analysis. This first analysis typically computes an expensive timing analysis that may employ statistical timing analysis and coupling. Upon completion of the analysis, the tool will then store the slack information from the environment, and then switches to a timing environment that is less compute expensive, wherein it applies cell and net scaling parameters prior to importing and applying the slack information stored from the initial timing environment. This allows optimizations to work in a fast incremental STA environment with slacks representative of compute intensive timing environment. Optimizations that make changes in this environment preferably are to have new slacks computed.

The flow chart shows a timing closure tool beginning with Step 200 which loads the design data, timing libraries, timing assertions and any other files required to initialize the timing environment. This environment is typically a compute-intensive or high-accuracy timing environment used for sign-off chip timing. After loading the required data, Step 201 begins the process of static timing analysis. This Step will generate required arrival times, arrival times and compute slacks Upon calculating all the slacks, Step 202 checks for timing violations. If the design has timing violations, the flow branches to Step 203. If the number of timing violations is below a specified user threshold it may be advantageous to remove the violations in a high accuracy timing environment rather than directly proceeding to Step 203.

Step 203 stores the slacks at each timing end point in the design. A timing end point consists of a latch input data pin or a design boundary output pin. The slacks can be stored in memory for use by the same process or saved to a disk for access by a separate process.

Step 204 shows the timing setup of an environment suitable for optimization. Still at Step 204, the high-accuracy/compute-intensive delay calculators which were used in Step 201 are now substituted for low-accuracy calculators that are less compute-intensive. An example of a calculator change consists of switching from computing a RICE delay calculator to an Elmore delay calculator. Capacitive coupling and other run-time expensive calculations may also be disabled at this phase. The Step then applies cell and net delay multipliers to scale the delays.

Referring now to Step 205, the slack information generated from Step 203 is then imported and applied to the endpoints. This is done by computing the difference between the current slack and the imported slack, and then creating a required arrival time assertion that reproduces the imported slack. Culmination of the present step is a light-weight timing environment that can process large numbers of incremental updates typically encountered during optimization of a netlist. The optimizations are performed in the absence of the overhead of a high-accuracy/compute-intensive timing environment.

Step 206 is the design optimization step. Step 206 may employ any number of optimizations, including cell repowering for signal integrity, buffering for delay and slew correction, or post-routing optimizations that may re-work portions of the design to recover from wiring congestion.

Upon completing the design optimization in Step 206, the design may close on timing violations in the current STA but this does not necessarily guarantee that the timing will be closed when STA is performed in a high-accuracy timing environment. Therefore, following Step 206, the design may be exported to disk for later design finishing or the user may choose to re-spin the design in-core.

If the designer opts to re-spin the design in-core, the process preferably advances back to Step 201 and the high accuracy timing environment is reinitialized with the current design data. Returning to Step 201 will cause the design to be timing in the high-accuracy timing environment and it allows the designer to decide how to proceed with chip finishing. If there are a large number of problems remaining, it is preferable to continue to Step 203 again in an attempt to close on the timing violations. If there are a small number of violations remaining, then the timing incurred by switching between the timing environments may not be worth it. In such an instance the designer may choose to resolve these problems manually or allows the tool to commence the optimization of the problems in an expensive timing environment.

Figures 3A, 3B:
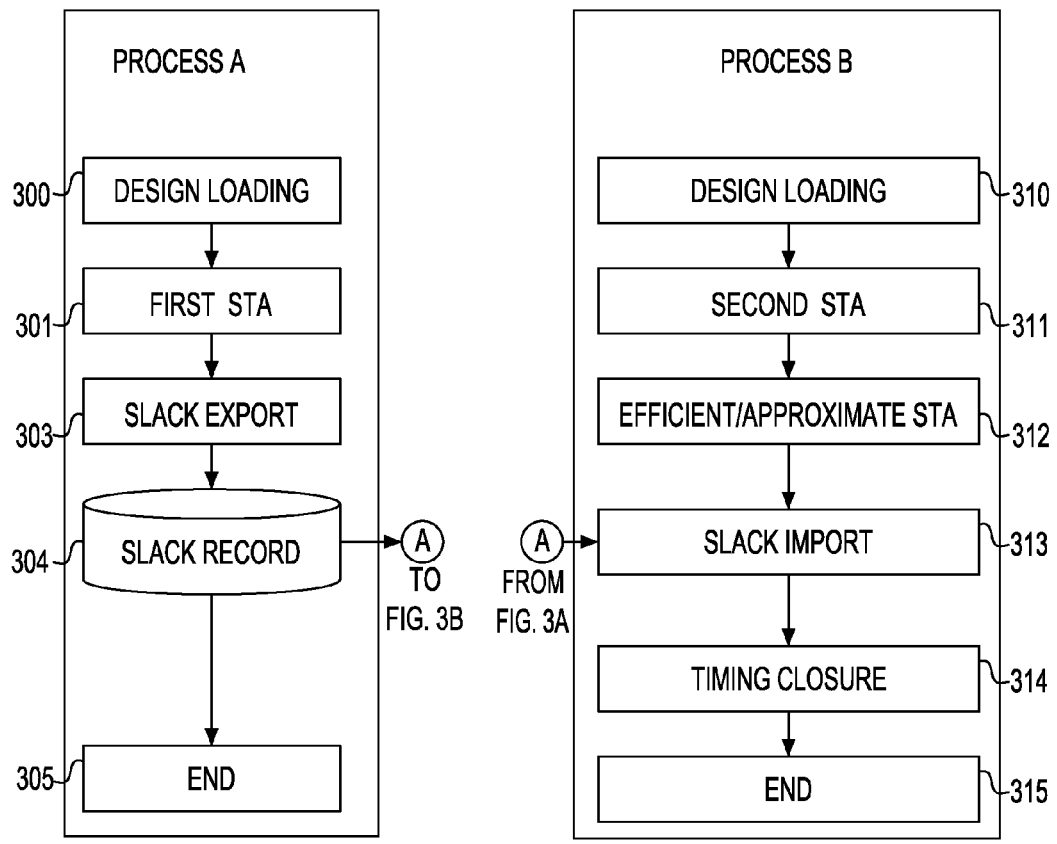

FIG. 3a illustrates an STA tool in a single timing environment that exports its slack information to disk. The exported slack information from Process A is used by Process B (FIG. 3b). The present flow is a prerequisite for Process B, preferably to be utilized when the STA tool cannot initialize multiple timing environments. Upon importing the slack information from Process A (FIG. 3a), STA is preferably applied scaling parameters to cells and nets for the new analysis modes.

FIG. 3a further illustrates a process wherein a user invokes static timing analysis and generates a slack record. Step 300 is equivalent to Step 200 in FIG. 2; Step 301 is equivalent to Step 201 in FIG. 2; and Step 303 is similar to Step 203 in FIG. 2 except that in the latter flow the slack data is saved to file in disk instead of storage in memory. The outcome is a slack record; labeled 304, which can be used by a separate process to replicate the static timing analysis.

FIG. 3b depicts a diagram in which a process initializes a different timing analysis mode or corner of the same design as loaded in FIG. 3a. The process in FIG. 3b begins by loading the design data in Step 310, which preferably includes design library data, assertions, and any other files required. Step 311 then proceeds to initialize the static timing analysis in a different timing analysis mode or corner than the one initialized by 3a. Step 312 will then create an incremental timing environment for optimization. Step 312 commences by applying net and cell scaling factors. The scaling factors will typically have been pre-computed. Step 312 may also change circuit and net delay calculators as necessary to improve run time. Step 313 then imports the slack file. This slack file will recreate the end-point slacks from as they existed in Process A from FIG. 3a. The process of recreating slacks for Step 313 is described in more detail within FIG. 5. Upon finishing Step 313, the timing model is now ready and Step 314 can proceed with timing closure.

Figure 4:
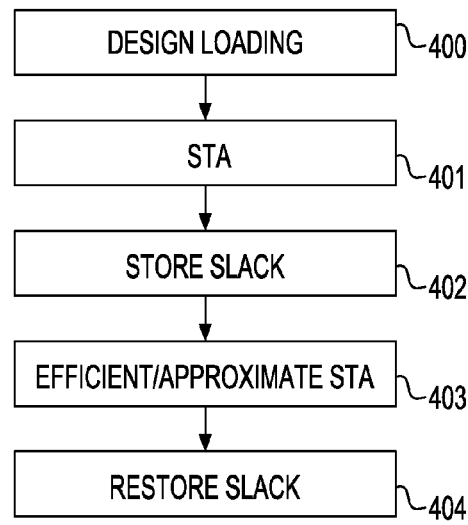
FIG. 4 illustrates the process of creating an incremental timing environment for optimization, in which the STA utilizes slack information stored in memory and prepares a timing environment for optimization.

FIG. 4 illustrates a design flow that stores slack information in memory and then retrieves it at a later point for the purpose of restoring the initial slack. Step 400 loads the design data, timing libraries, timing assertions and any other files required to initialize the timing environment. Step 401 performs a static timing analysis that will generate required arrival times (RATs), arrival times (ATs) and slacks. Step 402 stores the slack information for each design end-point in memory. A design end-point is typically a latch data input pin or a design boundary output pin. The stored slack information may reside in as a data structure that is part of the timing graph, or as part of the design model through the use of a keyword. Step 403 then performs an approximate/efficient STA, which is equivalent to description provided in from FIG. 2 Step 203. Step 403 then visits each end-point and retrieves the stored slack value in memory. The stored slack is then used to compute a new slack, as described in FIG. 5.

Figure 5A:
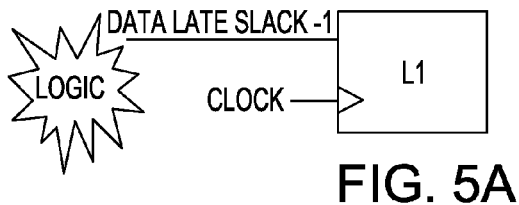
FIG. 5 illustrates how a slack record is used to create or modify a timing assertion to replicate the stored slack.
Figure 5B:
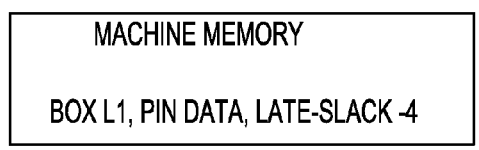

Referring to FIG. 5, a comprehensive example is illustrated showing how a slack from storage or memory is retrieved and applied to the design. FIG. 5a shows the computed data arrival time (AT), the computed data required arrival time (RAT) and resultant computed data pin slack at the end-point for setup time slack. In the present example, the data AT is 10 ps and the RAT is 9 ps. The computed slack for this point will therefore be −1 ps.

Further referring to FIG. 5, it is shown how a stored slack value is used to compute a new required arrival time. In this diagram the stored slack is −4 ps. The difference between the current slack and stored slack value is calculated, and this value is then used to compute a new required arrival time. Upon calculating a new RAT, a timing assertion or timing constraint can be used to change the RAT at this end point.

Figure 5C:
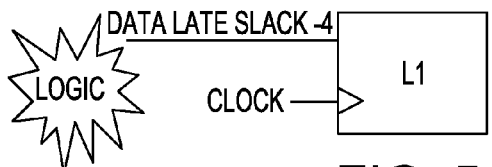

FIG. 5c shows the application of the new computed required arrival time, thereby replicating the slack retrieved from storage. In accordance with static timing analysis, a change to the RAT will be propagated backwards through the netlist and new slacks for each segment of the timing graph will be computed.

Figure 6A:
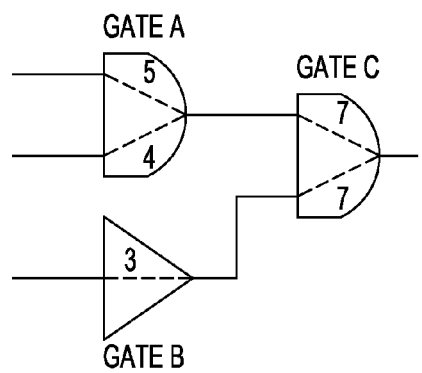
FIG. 6a-6b show the initial gate delays (FIG. 6a) and an illustrative application of a 90% cell delay scaling factor to be used to approximate the delays of the analysis mode corresponding to the loaded slack records (FIG. 6b).

Referring to FIG. 6, exemplary effects of delay scaling parameters are shown, with FIG. 6a showing several interconnected gates and corresponding computed cell delays. Shown in FIG. 6a is a logic gate labeled "Gate A" is an AND gate where one input has a segment delay of 5 ps to the output, and the other input has a segment delay of 4 ps.

Figure 6B:
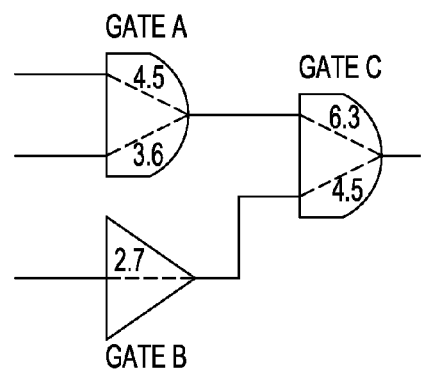

FIG. 6b applies to the same section of the netlist as illustrated with reference to FIG. 6a but after delay scaling has been applied. In the present example, cell delays have been scaled to 90% of their respective delay. In FIG. 6b, the logic gate labeled "Gate A" now has segment delay of 4.5 ps instead of 5 ps, and a 3.6 ps delay instead of 4 ps for the other segment.

The scaling factors can be computed using the average delay ratio from the delays of the previously stored analysis mode vs. the fast analysis mode used for optimization. If the STA environment was able to initialize more than one analysis mode, then one can dynamically compute the scaling factors because this information is immediately accessible. However, if more than one analysis mode could not be initialized (because they were incompatible, e.g., as in the illustrated NDR case in FIG. 6b), then the scaling factors can be computed in a pre-processing step. In some cases the pre-processing step may involve examining the timing reports generated by the STA tool for chip timing. An ideal timing report would be one that contains gate delay, and the gate delays between both STA environments can be compared to determine the scaling ratios.

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction of a simple illustrative embodiment, it is to be understood that one of ordinary skill in the art can extend and apply this invention in many obvious ways. Other embodiments of the invention can be adapted thereto. It is evident that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method for performing a static timing analysis based on slack values to verify and optimize a logic design, comprising:
   a) using a computer, selecting at least one circuit within the logic design having at least two inputs taking on at least one known value;
   b) identifying a critical input that controls an output arrival time (AT) of the selected circuit from among said at least two inputs that take on at least one known value;
   c) determining for at least one non-critical input of said circuit that is not the identified as the critical input a required arrival time based on a difference between arrival times of the critical and non-critical inputs; and
   d) computing a slack at a critical input based on said difference between the AT of the critical and non-critical inputs.

2. The method as recited in claim 1 wherein said design optimization is based on the slack determined by said arrival time difference.

3. The method as recited in claim 2 further comprises optimizing said design using a Reverse Merge Margin (RMM) design metric.

4. The method as recited in claim 3 wherein said RMM design metric determines a required amount of improvement in the input arrival time of a non-critical signal of a clock shaping circuit.

5. The method as recited in claim 3 wherein said RMM design metric achieves a cycle time improvement in paths forming said circuit, integrating said RMM design metric.

6. The method as recited in claim 3, wherein said RMM design metric is determined on a non-critical input pin as a function of the slack of the critical input pin.

7. The method as recited in claim 6, wherein said slack of said critical input pin is provided by clock shaping circuit.

8. The method as recited in claim 6, wherein calculating said slack captures a true nature of signal criticality in said RMM design metric.

9. The method as recited in claim 6, wherein said slack values at said non-critical pin are continuous as the values applicable to said critical pins.

10. The method as recited in claim 6, further comprising determining valid slack values defined by said critical and non-critical pins, wherein said timing optimization provides an improvement by automatically providing said slack values.

11. The method as recited in claim 6, further comprising improving timing reports and timing optimization based on said computing the slack on sub-critical inputs to reverse merge points.

12. The method as recited in claim 11, further comprising integrating said design metric for enabling treating said circuits with said reverse merge.

13. The method as recited in claim 1 further comprising ensuring that said circuit design is operational by providing an early analysis to ensure that traveling signal remain active long enough to be captured by a timing element.

14. The method as recited in claim 13, wherein said early mode analysis slows down paths that are too fast and overwrite said signals before being stored.

15. The method as recited in claim 13, further comprising a late mode analysis, ensuring that a latest possible arriving signal at a storage element is correctly captured, and wherein said timing paths are speeded up to reach a predetermined frequency.

16. The method as recited in claim 1, further comprising importing rules and assertions to create a single integrated and incremental timing environment to achieve said optimization.

17. The method as recited in claim 16 further comprising merging timing data from one of said analysis modes into another and using the combined timing data to drive said design optimization without being limited to holding violations.

18. The method as recited in claim 1 further comprises providing timing closure optimization repair problems when multiple timing analysis modes are not immediately available or when the timing closure in a particular timing environment is run-time prohibitive.

19. A system for performing a static timing analysis based on slack values to verify and optimize a logic design, comprising:
   a) using a computer, selecting at least one circuit within the logic design having at least two inputs taking on at least one known value;
   b) identifying a critical input that controls an output arrival time (AT) of the selected circuit from among said at least two inputs that take on at least one known value;
   c) determining for at least one non-critical input of said circuit that is not the identified as a critical input a required arrival time based on a difference between arrival times of the critical and non-critical inputs; and
   d) computing a slack at a critical input based on said difference between the AT of the critical and non-critical inputs.

20. A computer program product for performing a static timing analysis based on slack values to verify and optimize a logic design, comprising:
   a) computer program code configured for selecting at least one circuit within the logic design having at least two inputs taking on at least one known value;
   b) computer program code configured for identifying a critical input that controls an output arrival time (AT) of the selected circuit from among said at least two inputs that take on at least one known value;
   c) computer program code configured for determining for at least one non-critical input of said circuit that is not the identified as a critical input a required arrival time based on a difference between arrival times of the critical and non-critical inputs; and
   d) computer program code configures for computing a slack at a critical input based on said difference between the AT of the critical and non-critical inputs.

* * * * *